April 7, 1942. G. E. BARNHART 2,278,908
THERMAL ENERGY RESPONSIVE INDICATING DEVICE
Filed Feb. 12, 1940
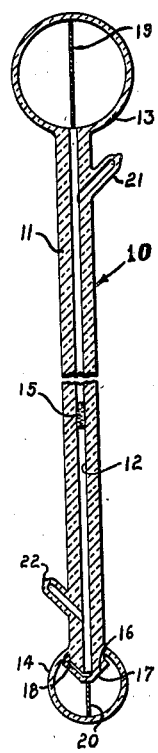
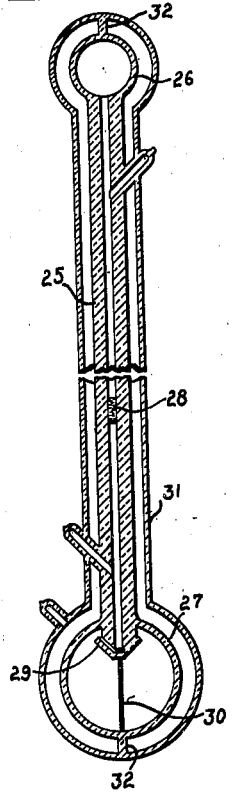
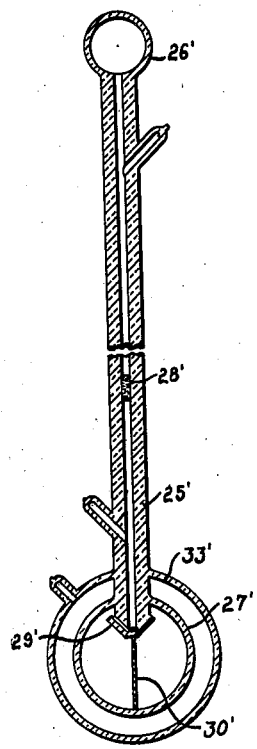
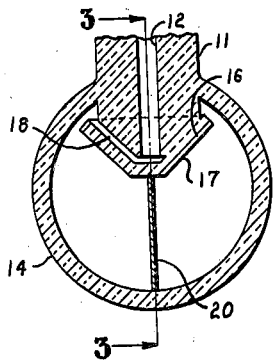
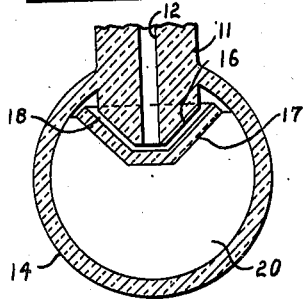
INVENTOR.
George E. Barnhart.
BY
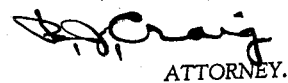
ATTORNEY.

Patented Apr. 7, 1942

2,278,908

UNITED STATES PATENT OFFICE 2,278,908

THERMAL ENERGY RESPONSIVE INDICATING DEVICE

George E. Barnhart, Pasadena, Calif.

Application February 12, 1940, Serial No. 318,455

5 Claims. (Cl. 73—340)

This invention relates to recording apparatus.

The general object of the invention is to provide a novel thermal energy indicating instrument.

A more specific object of the invention is to provide a novel instrument adapted to record the effect of heat energy thereon.

A further object of my invention is to provide an instrument protected from certain temperature changes to thereby furnish an indicator of thermal energy associated with luminous radiation effects.

A further object of the invention is to provide a novel instrument adapted to indicate the thermal effect of luminous radiation thereon.

A further object of my invention is to provide a novel instrument capable of a single reading for combined barometric pressure, temperature and thermal energy associated with luminous radiation.

An additional object of my invention is to provide a novel instrument capable of a single reading for combined thermal energy associated with luminous radiation and temperature.

Other objects and the advantages of this invention will be apparent from the following description taken in connection with the accompanying drawing, wherein:

Fig. 1 is a central sectional view through an instrument embodying the features of my invention;

Fig. 2 is an enlarged fragmentary sectional view showing a portion of an instrument;

Fig. 3 is a section taken on line 3—3, Fig. 2;

Fig. 4 is a view similar to Fig. 1 showing a modification; and

Fig. 5 is a view similar to Fig. 1 showing another modification.

Referring to the drawing by reference characters I have shown my invention as embodied in an indicating instrument which is indicated generally at 10 and which is made of glass, a transparent plastic or other suitable transparent material.

As shown the instrument includes an elongated capillary tube 11 having a bore 12 therethrough and having a relatively large bulb 13 at one end and a relatively small bulb 14 at the other end. Both bulbs communicate with the bore 12. The bulbs and the tube are filled with a suitable gas such as nitrogen and a drop 15 of liquid such as benzol is placed in the bore 12 and is in direct contact with the gases in the two ends of the tube 11.

The tube 11 extends some distance into the bulb 14 where it is beveled as at 16. A tapered cup member 17 is shown as integral with the lower end of the tube and includes a portion spaced from the beveled portion 16 to provide a narrow inverted frusto-conical cavity 18.

In each of the bulbs 13 and 14 I arrange plates 19 and 20 which may be blacked to absorb heat or may be of any desired color for the same purpose. The plates 19 and 20 may be of metal or cardboard or other suitable material and they are preferably planar.

Filling tips 21 and 22 may be employed to introduce the gas in an instrument.

In use the instrument is placed so that the bulbs 13 and 14 and the plates 19 and 20 therein are in the correct position. The drop or indicator 15 is sensitive to heat transferred to the gas within the bulbs by conduction and by radiation and to thermal energy associated with luminous radiation absorbed by the plates 19 and 20, both of which transfer the heat to the gas within the respective bulbs.

In Fig. 4 I show a modification of my invention wherein the capillary tube 25 is connected to a small bulb 26 and to a larger bulb 27 with a filling of gas in the bulbs and tubes and with an indicating drop 28 similar to the drop 15. The bulb 26 is shown as of less capacity than the bulb 27. A drip receptacle 29 and a heat absorbing plate 30 similar to the receptacle 17 and the plate 20, respectively, are disposed in the bulb 27. A heat insulating jacket 31 surrounds the bulbs and tube and is spaced therefrom. The jacket 31 is held in place by spacing members 32. The space between the jacket 31 and the tube and bulbs is exhausted.

In Fig. 5 a construction is shown which is similar to the construction shown in Fig. 4 and similar parts are indicated by similarly primed reference numerals. In the modification the heat insulating jacket 33' surrounds only the bulb 27' and the lower part of the tube 25'.

The use of the modifications shown in Figs. 4 and 5 is similar to the use of the instrument shown in Fig. 1, although it is adapted for other uses.

By employing bulbs of different capacities I secure differential pressure effects so that more accurate readings may be made. Also by employing heat absorbing plates in both bulbs a differential heat absorbing effect is secured to thereby increase the accuracy of the readings.

From the foregoing description it will be apparent that I have invented a novel instrument.

Having thus described my invention, I claim:

1. In an instrument of the class described, an elongated transparent tube having a bulb communicating with each end thereof, a drop of opaque liquid in said tube, a filling of gas in the tube at each end of the drop and in the bulbs, one of said bulbs being larger than the other, and a heat absorbing plate mounted in each of said bulbs, the heat absorbing plate in the larger bulb being of greater area than the heat absorbing plate in the smaller bulb, said heat absorbing plates being co-planar.

2. In an instrument of the class described, an elongated transparent tube having a bulb communicating with each end thereof, a drop of opaque liquid in said tube, a filling of gas in the tube at each end of the drop and in the bulbs, and a receptacle in one of said bulbs, said receptacle including a portion slightly spaced from the end of said tube and disposed coaxial with the tube.

3. In an instrument of the class described, an elongated transparent tube having a bulb communicating with each end thereof, a drop of opaque liquid in said tube, a filling of gas in the tube at each end of the drop and in the bulbs, one end of said tube extending into one of the bulbs, said end having a beveled extremity, a receptacle disposed coaxial with the tube and including a portion slightly spaced from the beveled end of the tube.

4. In an instrument of the class described, an elongated transparent tube having a bulb communicating with each end thereof, a drop of opaque liquid in said tube, a filling of gas in the tube at each end of the drop and in the bulbs, one end of said tube extending into one of the bulbs, said end having a beveled extremity, a receptacle disposed coaxial with the tube and including a portion spaced from the beveled end of the tube, and a heat absorbing plate mounted in each of said bulbs, said heat absorbing plates being co-planar, the plate in the bulb at said one end engaging said receptacle.

5. In an instrument of the class described, an elongated transparent tube having a bulb communicating with each end thereof, a drop of opaque liquid in said tube, a filling of gas in the tube at each end of the drop and in the bulbs, one end of said tube extending into one of the bulbs, said end having a beveled extremity, a receptacle disposed coaxial with the tube and including a portion spaced from the beveled end of the tube, and a heat absorbing member mounted in one of said bulbs, said heat absorbing member being planar, the member in the bulb at said one end engaging said receptacle, and a transparent heat insulating jacket surrounding said one bulb.

GEORGE E. BARNHART.